Oct. 2, 1962 W. A. DANIEL 3,056,589

RADIALLY VIBRATILE CERAMIC TRANSDUCERS

Filed June 23, 1958

INVENTOR.
W. A. DANIEL
BY
ATTORNEY

United States Patent Office 3,056,589
Patented Oct. 2, 1962

3,056,589
RADIALLY VIBRATILE CERAMIC TRANSDUCERS
William A. Daniel, Van Nuys, Calif., assignor to The Bendix Corporation, a corporation of Delaware
Filed June 23, 1958, Ser. No. 743,933
4 Claims. (Cl. 259—1)

This invention relates to transducers for generating sonic (including ultrasonic) waves in liquids, and particularly transducers employing radially vibratile annular vibrators of electromechanically sensitive ceramic materials such as, for example, barium titanate.

In such vibrators, either the inner or the outer surface must be in contact with the liquid in which the waves are to be generated, and the other must not be. Therefore, a liquid barrier must be provided at one or both ends of the annular vibrator for isolating the liquid from the other face. The vibrator must also be supported in such a way as not to impede its radial vibration. A structure for performing these two functions is disclosed in Camp Patent No. 2,906,991 issued September 29, 1959, on application Serial No. 518,316, filed June 27, 1955. That structure utilizes a casing having end walls containing annular grooves juxtaposed to the ends of the annular vibrator, with rubber O-rings in the grooves and protruding therefrom into light contact with the ends of the vibrator. That prior structure is highly successful with vibrators that are truly annular; that is, circular at the end portions in contact with the O-rings. Unfortunately, however, it is difficult and expensive to produce large, cylindrically true, ceramic elements. Even with the best known techniques, distortion takes place in drying and firing, resulting in many units that depart from true cylindrical shape to such an extent that they are unfit for mounting in the structure of the prior application and must be rejected.

An object of this invention is to provide a transducer construction utilizing the principle of the above-referenced Camp application, but capable of use with vibratile elements departing substantially from true cylindrical shape. The foregoing object is accomplished by cementing to the ends of the annular vibratile elements thin, flat rings which constitute the bearing surfaces for the O-rings to seal against. The rings are of greater radial width than the radial thickness of the vibratile element to contact the entire end area of the latter despite departures from true circular shape of the element, but are thin enough axially to vibrate radially with the element.

Another object is to provide a transducer structure employing an annular vibratile element or elements suitable for use in sonic cleaning or treating apparatus.

Another object is to provide a transducer structure employing an annular element suitable for vibrating a liquid medium within a pipe.

Other more specific objects and features of the invention will appear from the following description with reference to the drawing, in which.

Figure 1:
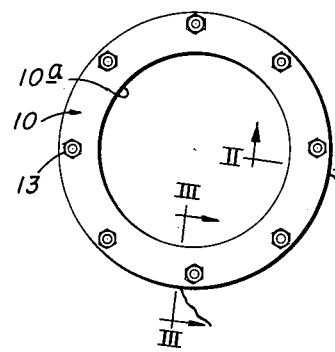
FIG. 1 is a plan view of a transducer element in accordance with the invention.
Figure 3:
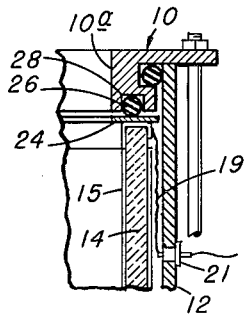
FIG. 3 is a detailed vertical section taken in the plane III—III of FIG. 1.
Figure 2:
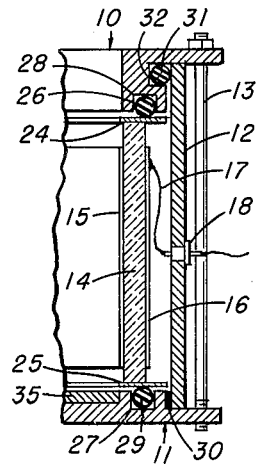
FIG. 2 is a detailed vertical sectional view taken in the plane II—II of FIG. 1.

Referring to FIGS. 1, 2 and 3, the transducer unit therein disclosed comprises a casing having an upper end wall 10 and a lower end wall 11, which are clamped against the opposite ends of a cylindrical wall 12 by bolts 13 to form a rigid casing in which the end walls 10 and 11 are rigidly supported in fixed spaced relation to each other.

Positioned radially within the cylindrical wall 12 and longitudinally between the end walls 10 and 11 is a radially vibratile, hollow, generally cylindrical element 14 which may be of a ceramic material having electromechanical response and vibratile radially in response to application of alternating potential to inner and outer electrodes 15 and 16, respectively. These electrodes 15 and 16, although shown as having appreciable thickness in the drawing, are usually very thin layers of silver deposited on the element 14. Connection may be made to the outer electrode by a lead 17 soldered thereto and extended through the wall 12 by an insulating bushing 18. Connection to the inner electrode 15 may be made as shown in FIG. 3 by extending a tab of the material 15 over the upper end surface of the element 14 and connecting it to a second lead 19 which is extended through the wall 12 by an insulating bushing 21.

There are cemented to the upper and lower ends of the element 14 a pair of rings 24 and 25, respectively, which bear against O-rings 26 and 29, respectively, mounted in grooves 28 and 27, respectively, in the upper and lower end walls 10 and 11, respectively.

The rings 24 and 25 are truly circular and have inside diameters substantially less than the mean inside diameter of the element 14, and outside diameters substantially greater than the mean outside diameter of the element 14. The outer edges of the rings 24 and 25 are spaced very slightly from the inner surface of the cylindrical wall 12, so that the latter functions to limit the radial movement of the rings 24 and 25 and thereby maintain them in proper registration with the sealing rings 26 and 29.

With the construction described, the vibratile generally cylindrical element 14 can depart considerably from true cylindrical shape without destroying the sealing action of the rings 26 and 29, since the latter are always substantially aligned with the rings 24 and 25. In the section II—II of FIG. 1, the element 14 is displaced inwardly from the position it would occupy if it were a true cylinder, and in the section III—III shown in FIG. 3 it is displaced outwardly. Even greater departures from perfect symmetry of the element 14 than those shown in the drawing can be tolerated.

Although it is not always essential, the space between the outer surface of the element 14 and the inner surface of the outer cylindrical wall 12 may be sealed, as by providing a gasket or cemented joint 30 between the lower inner surface of the cylinder 12 and a juxtaposed shoulder on the lower end plate 11, and by an O-ring 31 mounted in a groove 32 in the upper member 10 and bearing against the inner surface of the cylinder 12. The cemented joint 30 may be of a permanent nature, since it is not usually necessary to disassemble the cylinder 12 from the lower end wall 11. The use of the O-ring 31 at the upper end permits removal of the upper end wall 10 for replacement of the element 14 or the O-rings 26 and 29.

Figure 4:
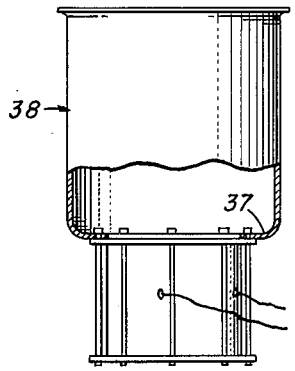
FIG. 4 is an elevational view, partly in section, showing a sonic cleaning tank incorporating an element in accordance with FIGS. 1, 2 and 3.

The complete unit described with reference to FIGS. 1, 2 and 3 may be employed to energize a small sonic treating or cleaning tank, as shown in FIG. 4. In this instance, the lower end wall 11 (FIG. 2) is closed and may be desirably reinforced on its inner surface by a lead disk 35 to provide acoustic reflection of waves generated in the liquid within the element by the radial vibration of the element 14, or by a pressure-release material such as closed cellular rubber, depending upon the length of the ceramic cylinder in terms of the wavelength of sound in the liquid; i.e., with a cylinder length of $$\frac{\lambda}{4}$$

lead may be used, and with a cylinder length of $$\frac{\lambda}{2}$$

pressure-release material is used. The upper end wall 10 is open, as shown in FIG. 2, and has joined to its upper surface the inwardly directed flange 37 at the bottom of a cylindrical tank 38 of somewhat larger diameter than the transducer unit. In such a device, the radial vibration of the element 14 is capable of generating powerful sonic vibrations in a liquid, not only within the element 14 itself, but in the entire tank 38.

Figure 5:
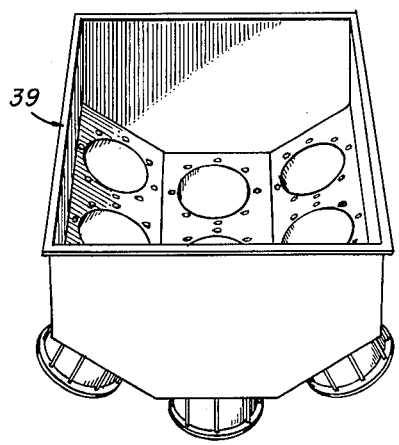
FIG. 5 is a perspective view of a sonic treating tank employing a plurality of transducer units in accordance with FIGS. 1 to 3.

A larger cleaning or treating tank 39 is shown in FIG. 5 which is similar to the construction of FIG. 4, except that it has a plurality of the transducer units positioned in the lower portion of the tank.

Figure 6:
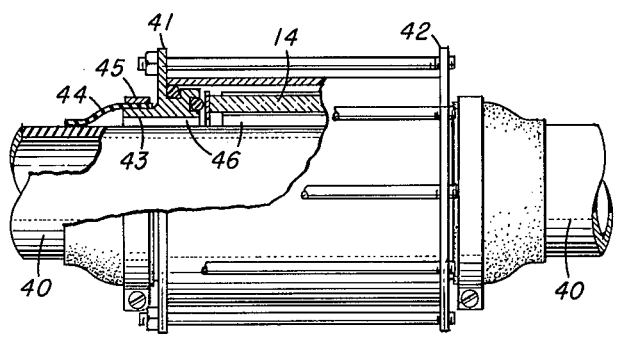
FIG. 6 is a longitudinal view, partially in elevation and partially in section, showing a transducer assembly in accordance with the invention for generating sonic waves in a medium within a pipe.

FIG. 6 shows an adaptation of the structure described with reference to FIGS. 1, 2 and 3 for use in generating sonic vibrations in a medium contained within a pipe 40 of somewhat smaller outside diameter than the inside diameter of the openings 10a in the end walls 41 and 42, both of which are open, like the upper end wall 10 in FIGS. 2 and 3. The only difference between the end walls 41 and 42 of FIG. 6 and the end wall 10 of FIGS. 2 and 3 is that the end walls 41 and 42 have longitudinally extending nipples 43 which receive annular flexible seals 44, which may be clamped thereto by clamps 45. The outer ends of the annular seals 44 may be cemented to the pipe 40. The construction described provides a sealed chamber 46 between the inner surface of the vibratile element 14 and the outer surface of a portion of the pipe 40 intermediate the two seals 44, and this sealed space may be filled with a liquid, such as water or castor oil, having suitable acoustic properties for transmitting the sonic waves from the inner surface of the element 14 to the outer surface of the pipe 40. The pipe 40 is preferably of a material having a reasonably good impedance match to the liquid within the space 46 and the liquid within the pipe 40. Rubber is one suitable material for this purpose, although results can be obtained with thin metal pipes. It is to be understood that the word "pipe," as used herein, is not limited to any particular material.

Figure 7:
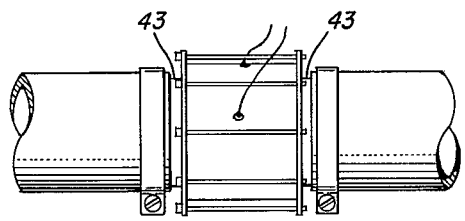
FIG. 7 shows the transducer construction of FIG. 6 connected between two sections of pipe.

The construction shown in FIG. 6 is desirable in many situations where the material to be treated within the pipe is not compatible with the material of the vibrator 14. Where this problem does not exist, the pipe can be cut in two and the ends secured directly to the nipples 43, as shown in FIG. 7.

As a typical example, a device constructed in accordance with the invention for operation at 10,000 cycles per second had the following dimensions:

Average internal diameter of element 14 _____ 5"
Length of element 14 _____ 2¾"
Wall thickness of element 14 _____ ³⁄₁₀"
Internal diameter of rings 24, 25 _____ 4⅝"
Outside diameter of rings 24, 25 _____ 5⅜"
Thickness of rings 24, 25 _____ .030"

The rings 24, 25 were of stainless steel. Other suitable materials are Micarta, Bakelite, Melamine, and various plastics. The rings were cemented to the element 14 with an epoxy cement. Other suitable adhesives are polyesters, phenolic resins, etc.

Although for the purpose of explaining the invention a particular embodiment thereof has been shown and described, obvious modifications will occur to a person skilled in the art, and I do not desire to be limited to the exact details shown and described.

I claim:

1. Liquid-vibrating apparatus comprising: a radially vibratile hollow element of approximately cylindrical shape having parallel opposite end faces, said element being of electromechanically-sensitive material; means for electrically coupling said element to an electrical circuit; a pair of end rings bonded to said opposite end faces of said element and constituting with said element an integral vibratile assembly having coaxial annular opposite end faces defined by said end rings; casing means for supporting said assembly for radial vibration and forming a liquid barrier between the inner and outer faces of said element, said casing means comprising a pair of casing end walls juxtaposed to the respective end faces of said assembly, each said end wall having an annular groove therein opposite and of less radial width than the associated end ring of said assembly; an elastomer sealing ring in each said groove of such thickness as to project from the groove against the associated end ring of said assembly; means rigidly supporting said end walls with respect to each other and in spaced relation to said assembly such as to slightly compress each said sealing ring between the bottom of its groove and the associated end ring of said assembly, said sealing rings constituting the sole means axially supporting said assembly with respect to said casing means; and means other than said sealing rings for limiting transverse movement of said assembly with respect to said casing end walls.

2. Apparatus according to claim 1 in which said end rings have an internal radius less than the minimum internal radius of said element and an external radius greater than the maximum external radius of said element.

3. Apparatus according to claim 1 in which said end rings are so thin axially to vibrate radially with said element without appreciably loading it.

4. Apparatus according to claim 1 in which said means for limiting transverse movement of said assembly with respect to said casing end walls comprises means anchored to said end walls and extending past said end rings in slightly spaced relation thereto for limiting radial movement of the end rings with respect to said sealing rings.

References Cited in the file of this patent

UNITED STATES PATENTS

| | | |
|---|---|---|
| 2,578,505 | Carlin | Dec. 11, 1951 |
| 2,702,692 | Kessler | Feb. 22, 1955 |
| 2,893,707 | Gulton | July 7, 1959 |
| 2,906,991 | Camp | Sept. 29, 1959 |